Sept. 16, 1924.

L. E. HILL 1,508,695

SPREADING DEVICE FOR BINDERS

Filed Feb. 28, 1923

Inventor
Leon Ellsworth Hill
By his Attorneys

Patented Sept. 16, 1924.

1,508,695

UNITED STATES PATENT OFFICE.

LEON ELLSWORTH HILL, OF PONTIAC, MICHIGAN, ASSIGNOR TO GENERAL MOTORS CORPORATION, OF DETROIT, MICHIGAN, A CORPORATION OF DELAWARE.

SPREADING DEVICE FOR BINDERS.

Application filed February 28, 1923. Serial No. 621,961.

*To all whom it may concern:*

Be it known that I, LEON ELLSWORTH HILL, a citizen of the United States, and a resident of Pontiac, county of Oakland, and State of Michigan, have invented certain new and useful Improvements in Spreading Devices for Binders, of which the following is a full, clear, concise, and exact description, such as will enable others skilled in the art to which the invention relates to make and use the same, reference being made therein to the accompanying drawings, which form a part of this specification.

This invention relates to devices for handling welt strips carrying strips of piping, as for example strips of piping arranged to hide the heads of tacks or other fastenings used in attaching the welt strips, and is illustrated as embodied in a device for progressively spreading such strips of piping apart.

In handling welt strips having such piping, as for example in attaching them to automobile bodies, it has been necessary to turn back the strips of piping to spread them apart, usually with one finger, to facilitate the insertion of the welt-attaching fastenings and for other purposes. An object of the present invention is to eliminate the necessity of thus turning the strips of piping back by hand, by providing a novel device which is movable along a welt strip and which is provided with means progressively to turn back the piping.

One form of such device is formed with a member slidably embracing a welt strip, and with oppositely-disposed parts to engage a pair of strips of piping on the welt strip and progressively spread them apart. In the illustrated embodiment of the invention the welt-embracing member and the plow or piping-spreading parts are integral, as it is in practice convenient to make the device out of a piece of sheet metal by arranging the central part to engage the lower face of a welt strip, and by bending the sides upwardly and inwardly and downwardly to form the above described plow or spreading parts.

Whether or not the plow members are integral with the welt embracing member, I prefer that they should be arranged with their forward ends adjacent one another in the center of the welt strip, between the strips of piping, and with their rear ends spaced a substantial distance apart, to spread the strips of piping as described.

The above and other features of the invention, including the specific form of various parts of the device, will be apparent from the following description of the embodiment of the invention illustrated in the accompanying drawings, in which.

Figure 1:
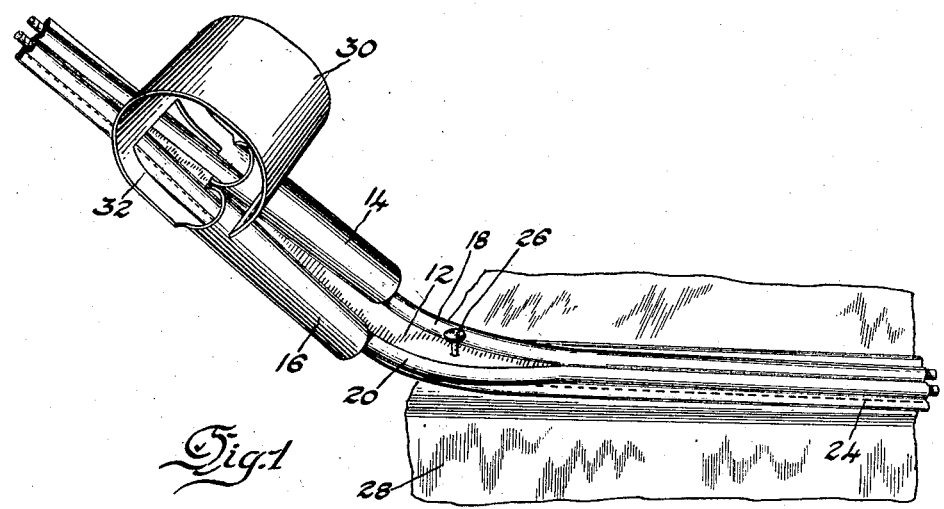
Fig. 1 is a perspective view of the device being used in attaching a welt strip.
Figure 2:
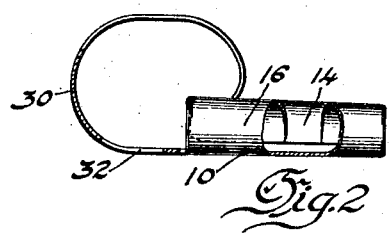
Fig. 2 is a side elevation, partly broken away of the device.
Figure 3:
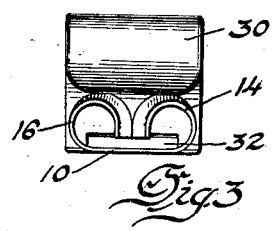
Fig. 3 is an end elevation of the device.

In the specific form shown in the drawings, the device is made from a single stamping of sheet metal. The central part 10 of the sheet metal engages the bottom surface of the welt strip 12, and the opposite sides 14 and 16 are bent upwardly and inwardly and downwardly to form plow or spreading parts. These parts engage respectively strips 18 and 20 of piping made by turning the sides of the bottom lamination of welt strip 12 over on themselves, enclosing wires or other padding if desired, and stitching at 22 and 24 in such a manner that the strips of piping tend to spring toward one another to hide fastenings 26 attaching the welt strip to an automobile body 28 or some other object.

It will be observed that the forward ends of plow or spreading parts 14 and 16 are immediately adjacent one another, between the strips of piping, and that their rear ends are spaced a substantial distance apart, to spread the strips of piping and thus facilitate the insertion of fastenings 26.

I find it convenient to bend one end of the piece of sheet metal into a handle 30, to provide means for moving the device progressively along a welt strip. As shown in the drawings if handle 30 is turned upwardly it is perforated at 32 for the passage of the welt strip.

Figure 5:
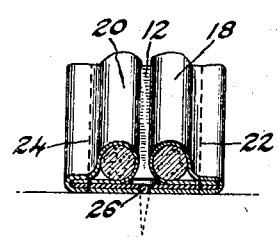
Fig. 5 is a corresponding view of the welt strip after the strips of piping have sprung back together to hide the fastening.
Figure 4:
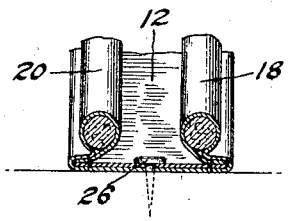
Fig. 4 is a view showing a piece of a welt strip with the strips of piping spread apart, just after the insertion of a fastening.

In operation, the device is threaded on a welt strip as shown in Fig. 1, with strips 18 and 20 of piping embraced respectively by plow or spreading parts 14 and 16. The device is then moved progressively along the welt strip, spreading the strips of piping temporarily apart while fastenings 26 are periodically inserted. When so spread apart, the strips of piping appear as in Fig. 4. After the device has been moved further along, the strips of piping spring back to hide the fastenings, as shown in Fig. 5.

While one specific form of device, and one construction of welt strip, have been illustrated and described, it is not my intention to limit the scope of the invention thereby, or otherwise than by the terms of the appended claims.

I claim:

1. A spreading device comprising a piece of sheet metal having a central portion to engage the bottom of a welt strip and having opposite sides bent upwardly and inwardly and downwardly to form oppositely-disposed plow parts to spread apart a pair of strips of piping carried by the welt strip.

2. A spreading device comprising a piece of sheet metal having a central portion to engage the bottom of a welt strip and having opposite sides bent upwardly and inwardly and downwardly to form oppositely-disposed plow parts to spread apart a pair of strips of piping carried by the welt strip and having one end bent into a handle for moving the device progressively along the welt strip.

3. A spreading device as defined by claim 2, in which the handle is bent upwardly above the welt strip and is perforated for the passage of the welt strip.

4. A spreading device comprising a piece of metal having a portion to engage the bottom of a welt strip, said portion being provided with means for spreading apart a pair of strips of piping carried by the top of the welt strip, and having a handle above the welt strip, the piece of metal having an opening between said portion and the handle for the passage of the welt strip.

In testimony whereof I affix my signature.

LEON ELLSWORTH HILL.